United States Patent [19]

Wang et al.

[11] 3,996,198
[45] Dec. 7, 1976

[54] ONE STEP PREPARATION OF LINEAR ANTIOXIDANT PHENOLIC POLYMERS INVOLVING USE OF IMPURE DIOLEFIN FEEDSTOCK AND ALUMINUM CATALYST UNDER ORTHO ALKYLATION CONDITIONS

[75] Inventors: Patricia C. Wang, Palo Alto; James A. Dale, Menlo Park, both of Calif.

[73] Assignee: Dynapol Palo Alto, Calif.

[22] Filed: Feb. 24, 1975

[21] Appl. No.: 552,059

[52] U.S. Cl. .............................. 260/62; 260/47 R; 260/47 UA
[51] Int. Cl.² ..................... C08G 65/40; C08F 4/52
[58] Field of Search ......... 260/62, 47 UA; 528/166

[56] References Cited
UNITED STATES PATENTS

| | | | |
|---|---|---|---|
| 2,224,837 | 12/1940 | Rosenthal et al. | 260/62 |
| 2,665,312 | 1/1954 | Ohlmann | 260/611.5 |
| 3,004,953 | 10/1961 | Sonnabend | 260/62 |
| 3,420,915 | 1/1969 | Braithwaite, Jr. | 260/837 R |
| 3,546,173 | 12/1970 | Hunt | 260/62 |
| 3,733,365 | 5/1973 | Yeakey et al. | 260/619 R |

Primary Examiner—Joseph L. Schofer
Assistant Examiner—Peter F. Kulkosky
Attorney, Agent, or Firm—William H. Benz

[57] ABSTRACT

Phenolic polymers having 3 to 1000 repeating units of the general structural formula

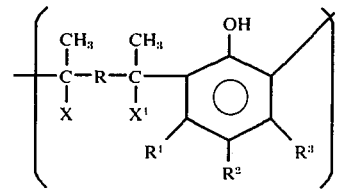

wherein X and X¹ independently are hydrogens or methyls, R is a lower alkyl of from 1 to 6 carbon atoms or an aryl, alkaryl or aralkyl of from 6 to 14 carbon atoms, and $R^1$, $R^2$ and $R^3$ independently are hydrogen, lower alkyls of from 1 to 6 carbon atoms, aralkyls of from 8 to 14 carbons, or alkoxys or aralkyloxys of from 1 to about 14 carbons, are prepared in one step by contacting an $R^1$, $R^2$ and $R^3$-containing phenol having two hydrogens ortho to the hydroxyl group with a low purity diolefinic hydrocarbon under ortho-alkylation conditions in the presence of an effective amount of an ortho-alkylation catalyst. These materials find use as antioxidants, especially for edibles, where their polymeric nature offers advantages.

6 Claims, No Drawings

ONE STEP PREPARATION OF LINEAR ANTIOXIDANT PHENOLIC POLYMERS INVOLVING USE OF IMPURE DIOLEFIN FEEDSTOCK AND ALUMINUM CATALYST UNDER ORTHO ALKYLATION CONDITIONS

BACKGROUND OF THIS INVENTION

1. Field of the Invention

This invention relates to a process for preparing condensates from phenolics and divinyl hydrocarbons. More particularly it concerns an improved process for preparing a condensate of phenol and divinylbenzene.

2. The Prior Art

It is shown in Hunt's U.S. Pat. No. 3,546,173 issued Dec. 8, 1970 that p-alkyl phenolic compounds and diolefinic hydrocarbons can be condensed in the presence of acidic catalysts such as boron trifluoride to yield polymer products. While the products of this prior process are similar to some of the products of the present process, the process itself has several major drawbacks. The acidic catalyst is not specific to ortho or para condensation of the phenolic so that if a phenol having hydrogen at its ortho and its para positions is employed, cross-linking alkylation at the ortho and para positions results to yield an intractable high molecular weight resin product. Also, as is expressly noted in the Hunt patent, this prior process requires a very pure diolefinic hydrocarbon feedstock, specifically one containing not more than 10% of nondiolefin impurities. Such a feedstock is extremely difficult to obtain. The diolefinic material is generally produced as a petroleum cut in which it is associated with mono-olefins, naphthas, and other hydrocarbons. Isolation by distillation is difficult at best because of the tendency of many diolefins to polymerize during distillation. It would be desirable and is an object of this invention to make available a process for forming essentially linear non-cross-linked soluble phenolic - diolefin polymers from economically attractive feedstocks.

It is a further object of this invention to provide a process for forming phenolic - diolefin polymers which employs low purity diolefin feedstocks.

REFERENCE TO RELATED APPLICATION

Our copending patent application Ser. No. 552,017 filed of even date herewith, deals with hydroquinonoid polymers and their production. The process of that application is similar to the present process in that it too can employ low purity diolefinic feedstocks and uses an ortho-alkylation catalyst.

STATEMENT OF THE INVENTION

It has now been found that an essentially linear polymer product having a molecular weight of at least about 600 can be formed by contacting a phenolic having two ortho hydrogens with a low purity (50 – 85% purity) diolefinic hydrocarbon under phenol alkylation conditions in the presence of a phenol ortho-alkylation catalyst. This finding was unexpected because in polymerization reactions involving a diolefin it is usual that substantial levels of impurities in the diolefin (such as 15–50% impurities) generally cause chain termination and prevent polymer formation.

DETAILED DESCRIPTION OF THE INVENTION

In accordance with the process of this invention, a low purity diolefinic hydrocarbon is reacted with a phenolic under ortho-alkylation conditions to yield a polymer product.

The Diolefinic Hydrocarbon Reactant

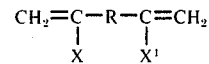

wherein $X$ and $X^1$ independently of one another are hydrogen or methyl groups, and $R$ is a lower alkyl of from 1 to 6 carbon atoms or an aryl, alkaryl or aralkyl of from 6 to 14 carbon atoms. The diolefins have their olefinic groups in terminal positions rather than in internal positions. They may contain additional unsaturation beyond the two olefinic unsaturations, in the form of aromatic rings, but otherwise are saturated.

Thus, typical diolefins include the lower alkadienes, both linear and branched such as 1,4-pentadiene, 1,5-hexadiene, 3-ethyl-1,5-hexadiene, 1,8-nonadiene and 3,5-dimethyl-1,7-octadiene; the diolefinic aryls 1,4-diisopropenylbenzene and 1,3-diisopropenylbenzene, 1,4-divinylbenzene and 1,3-divinylbenzene; the diolefinic alkaryls 2-methyl-1,4-divinylbenzene, 2-isopropyl-1,3- or 1,4-divinylbenzene, 2-t-butyl-1,4-divinylbenzene, 2,3-dimethyl-1,4-vinylbenzene and 2,5-di-t-butyl-1,4-divinylbenzene; and the aralkyls 1-vinyl-4-(propyl-2-ene)benzene and 1-vinyl-3-(butyl-3-ene)-benzene. These are merely illustrative and should not be interpreted as limiting the diolefins employed. Combinations of two or more diolefins can be employed, if desired. Butadiene, a very common diolefin, is not included within the definition of suitable diolefins. Butadiene does not work smoothly as a linking diolefin. This is believed to be due to the fact that butadiene, after attaching to one hydroquinone ring, is of a size to readily undergo cyclization into a five membered ring with the hydroquinolic hydroxyl and that this occurs preferentially to the desired linking. With this problem in mind, other diolefins which clearly can lead to simple five or six membered ring cyclization such as 2-methyl-1,3-butadiene or the like should probably be avoided.

Preferred among the diolefinic compounds are those compounds wherein $X$ and $X^1$ are both hydrogens and $R$ is an aryl or an alkaryl of from 6 to 14 carbons inclusive. Preferred among these are the divinylbenzenes including 1,4- and 1,3-divinylbenzene and the 1,4- and 1,3-divinylbenzenes which carry 1 or 2 alkyl ring substituents each of from 1 to 4 carbons inclusive such as 2-methyl-1,4- or 1,3-divinylbenzene, 2-t-butyl-1,4- or 1,3-divinylbenzene and 2,5-di-t-butyl-1,4- or 1,3-divinylbenzene. Most preferred diolefins are 1,4- and 1,3-divinylbenzene and mixtures thereof.

While a relatively pure diolefin will react suitably, its use would be uneconomical. To fall within the teachings of this invention, the diolefin can contain substantial amounts of non-diolefinic impurities. These impurities are primarily hydrocarbons such as monoolefins, saturated hydrocabons and napthas which distill at or about the same temperature as the diolefin. The amount of impurities may range from about 15% to about 50% by weight based on the total amount of diolefin plus impurities. Among diolefinic materials, the 50% to 80% pure divinylbenzenes are preferred, the remainder of such materials being diethylbenzene, ethylvinylbenzene, dimethylvinylbenzene and other similar-boiling about 10 carbon hydrocarbons. Such divinylbenzenes are marketed by Dow Chemical Company. Mixtures of two or more diolefins may be employed, if desired.

The Phenolic Reactant

Suitable phenolic reactants are those monohydroxybenzenes having two replaceable aromatic hydrogens ortho to the hydroxyl. They are represented structurally by the formula

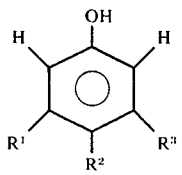

wherein $R^1$, $R^2$ and $R^3$ independently are hydrogen or lower alkyls of from 1 to 6 carbon atoms, alkaryls of from 8 to 14 carbons, alkoxys of from 1 to 6 carbons or alkaryloxys of from 8 to 14 carbons. Preferably at least 1 and more preferably at least 2 of $R^1$, $R^2$ and $R^3$ are hydrogens. Examples of phenolic reactants are phenol, the cresols (i.e., 3- or 4-methylphenol), 3-methyl-4-t-butylphenol, 3- or 4t-butylphenol, nonylphenol (generally available as a mixture of isomers), 3- or 4-(2-[4-ethylphenyl]ethyl)phenol; 3-t-butyl-4[2-phenylethyl]-phenol, i.e., bisphenol A, methoxyphenol, p-ethoxyphenol and the like. Mixtures of such phenols may be employed as well. A group of preferred phenols consists of phenol, cresol, 3,4-dimethylphenol, 4-ethylphenol, 4-t-butylphenol, and 4-n-butylphenol.

The Process Conditions

The present process involves contacting impure diolefinic hydrocarbon with phenolic under ortho-alkylation conditions. "Ortho-alkylation conditions" as the term is used herein is defined to include the following: a liquid reaction phase, an elevated temperature, an extended period of time, and an effective amount of a catalyst for the alkylation of phenolics in the ortho position.

The liquid reaction phase is provided either by the phenolic, the diolefin, the diolefin impurities, or an added aprotic liquid reaction solvent. Ethers, aromatic hydrocarbons, and cycloaliphatic hydrocarbons are representative of suitable added aprotic reaction solvents. Examples of suitable solvents include lower aliphatic ethers such as diethyl ether, diisopropyl ether and di-n-butyl ether; other ethers such as tetrahydrofuran, glyme, 1,2-dimethoxyethane, diglyme, anisole, diphenyl ether and phenetole; and the aromatic and cycloapliphatic liquid hydrocarbons of from about 6 to about 12 carbon atoms such as the xylenes, mesitylene, ethylbenzene, pseudocumene, phenylcyclohexane, diethylcyclohexane and the like. Preferred reaction solvents include cycloaliphatic and aromatic hydrocarbons, especially the xylenes and the trimethylbenzenes.

An elevated temperature such as 80° C or above is employed. Generally temperatures of from about 80° C to about 250° C are usable, with temperatures of from about 100° C to about 200° C being preferred. It is often convenient to employ the reflux temperature of the solvent system as the reaction temperature. Such temperatures range from about 100° C at atmospheric pressure. Superatmospheric pressures may be required if it is desired to use temperatures above the atmospheric reflux point.

The extended reaction times employed to effect production of the present polymers are inversely dependent upon the reaction temperature employed. Generally times of from about 1 hour to about 48 hours are employed, with times of from about 2 hours to about 20 hours being preferred.

An ortho-alkylation catalyst is present during the reaction. This catalyst may be any of the materials known to catalyze the ring alkylation of phenols in the ortho position. Such catalysts include for example, the metal phenolates described by Ecke and Kolka in U.S. Pat. No. 2,831,989 issued Apr. 22, 1958 i.e., phenoxy derivatives of Al, Mg, Fe, Zn, P, As, Sb, Bi and Sn; the polymeric or supported aluminum alcoholates set forth by Yeakey et al in U.S. Pat. No. 3,733,365 issued May 15, 1973; the aluminum mixed salts described by Hokama is U.S. Pat. No. 3,267,154 issued Aug. 16, 1966; and the metals of the 5th and 6th Periods of Groups IV-B and V-B taught by Leston in his U.S. Pat. No. 3,331,879 issued July 18, 1967, i.e., Zr, Hf, Nb, and Ta. Aluminum is a preferred catalytic material. The exact form of its addition is believed to not be critical. It is considered, but not known with certainty, that the aluminum, whether added initially as metal, as a salt such as aluminum isopropoxide or butoxide or as a complex such as triethyl aluminum or the like, reacts with the phenolic reactant to yield as actual active species, the corresponding aluminum phenolate. A similar conversion likely occurs in the case of other catalysts useful herein. Most preferred catalysts are the aluminum phenolates corresponding to the phenolic reactants.

The relative amounts of reactants and catalyst are controlled. The molar ratio of diolefinic hydrocarbon reactant to phenolic reactant can range from about 1:2 to about 2:1 and preferably ranges from about 1:1.5 to about 1.5:1. Gross excesses of diolefinic reactant are to be avoided as they can lead to formation of undesired diolefin homopolymer products. Generally, ratios of diolefin to phenolic of from about 1.1:1 to about 1:1.5 give best results.

A catalytically effective amount of catalyst is employed which amount may range from about 0.001 moles of catalyst per mole of diolefinic hydrocarbon up to about 0.1 moles of catalyst per mole of diolefinic hydrocarbon. Larger amounts can be employed but are not seen to offer any advantages. Preferred amounts of catalyst range from about 0.005 moles of catalyst per mole of diolefinic hydrocarbon to about 0.075 moles of catalyst per mole of diolefinic hydrocarbon reactant.

The initial maximum concentration of reactants in the reaction mixture should be controlled from about 0.1 to about 10 moles of diolefinic hydrocarbon per liter of reaction mixture.

The reaction mixture should be stirred during the reaction. The reaction can be carried out batchwise or with continuous feed of one or more of all of the feedstocks and continuous removal of product.

In a batch mode, especially if the ortho-alkylation catalyst is formed in situ in the reaction mixture, it is often desirable to contact the catalyst material or precursor with the phenolic reactant and solvent at or about the reaction temperature for a brief period, such as from 0.01 to 2 hours, preferably 0.02 to 2 hours, prior to adding the diolefinic reactant.

The product can be isolated by dilution with additional solvents and precipitation with non-solvents, or by washing with aqueous acid to remove the catalyst and thereafter extracted with water to remove residual acid. The polymer product may be fractionated into molecular weight cuts, if desired. Typical product work up schemes are illustrated more fully in the Examples.

The Polymer Product

The polymer products of this invention comprise repeating diolefin/phenolic units structurally depicted by the general structural formula

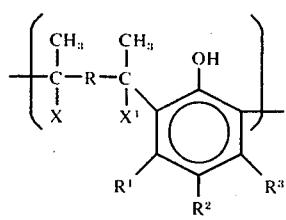

wherein X, X¹, R, R¹, R² and R³ are as already defined. This polymer product is an alternating diolefin-phenolic polymer. It is believed that very little if any homopolymerization of diolefin occurs.

The product is essentially a linear polymer. It is possible that small amounts of branching develop from additional (third and fourth) alkylations of the phenolic rings but, based on solubility and viscosity measurements, it is believed that branching is very minor — occurring on no more than one to 5 percent of the aromatic rings. The products are soluble in oils and the like.

The polymer product comprises $n$ repeating phenolic structural units of the type shown in the last structural formula. $n$ Has a value of from about 3 to about 1000, preferably from about 3 to about 100, most preferably from about 6 to about 80.

Use of the Polymer Products as Antioxidants

The product polymers are useful as antioxidants. When they are admixed with oxidizable substances such as plastics, rubbers, or deterioration-prone foodstuffs in an amount of from about 2 to 50,000 parts per million by weight (basis oxidizable substance), they function to retard oxidation of the substances. In rubbers and plastics these materials offer the advantage of being substantially nonvolatile and thus unlikely to be lost by vaporization. They are also less likely to migrate through these substrates. In oxidizable consumables, as exemplified by pharmaceuticals, vitamins and food products and food components such as edible oils, fats, essential oils, nuts and flavorings, an effective amount of these antioxidant materials, such as from 2 to 10,000 parts per million by weight or preferably from 5 to 1000 parts per million by weight, is generally employed. In such use, the high molecular weight and concomitant low migration and volatility greatly enhance product processing such as by reducing steam distillation of the antioxidants and eliminating the need to continually add additional antioxidant to compensate for such loss. Also, the antioxidants of this invention because of their large molecular size present the advantage of nonabsorptivity through the walls of the gastrointestinal tract, thereby eliminating any risk of toxicity.

When used as antioxidants for oxidizable substances, these materials are intimately admixed with the oxidizable substance such as by being dissolved in the oxidizable substance, by being mixed as solid particles through the oxidizable substance, by being added as a solution in a suitable carrier, or the like.

The materials of this invention, their production and their use are further illustrated in the following Examples. These are intended only to demonstrate the invention and are not to be construed as limiting its scope, which scope is instead defined by the appended claims.

EXAMPLE I p-cresol (10.85 g — Aldrich — 94% pure), xylene (1 ml), and aluminum turnings (0.101 g B&A No. 1222) were heated together for 15 minutes at 160° C. The aluminum dissolved to give the p-cresolate. The mixture was cooled and low purity divinylbenzene (15.6 g — Dow — 75% pure) and 19 ml of xylene were added. The mixture was heated to reflux at 150° C and maintained for 15¼ hours. A sample (I a) was taken and the mixture was heated for an additional 3¼ hours. The mixture was worked up by dilution with dichloromethane, washing with dilute hydrochloric acid, washing (3 times) with water, drying and evaporating off solvent. The resulting product was redissolved in methylene chloride and dropped into hexane to cause precipitation of the polymer product (I b) which was isolated and dried.

The two products were tested by gel permeation chromatography comparison with polystyrene standards of known molecular weight. By this test, product I a exhibited GPC movement equivalent to polystyrene of molecular weight 2800 while product I b exhibited a molecular weight of 3600. The product was analyzed by NMR and various spectral and titration techniques and gave results consistent with the structure

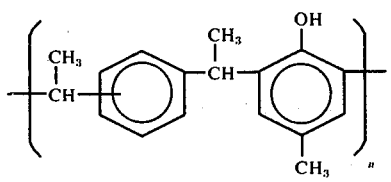

EXAMPLE II

The preparation of Example I was repeated using p-ethylphenol in place of p-cresol and with a different solvent. The reactant amounts were:

| | |
|---|---|
| p-ethylphenol | 6.1 g |
| aluminum | 0.047 g |
| divinylbenzene (75% pure) | 8.1 g |
| solvent (mesitylene) | 14 ml |

The reaction was run for 10 hours to yield a product (II a) of molecular weight 2500–2600. After work up, the product (II b) had a molecular weight of 2600 and a structure consistent with the formula

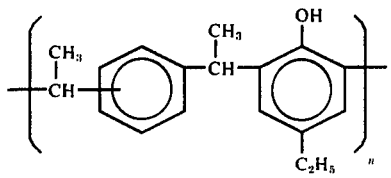

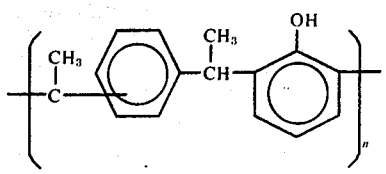

wherein *n* is about 30, and the peak molecular weight is 7,000 in comparison to a polystyrene standard.

EXAMPLE III

The preparation of Example I was repeated with a variation.

In place of p-cresol - a mixture of p-cresol and bisphenol-A, i.e.,

EXAMPLE V

Aluminum metal, (0.024 g) and 0.523 g of p-cresol are heated together for 30 minutes in a 160° C oil bath. Next, p-methoxyphenol (3,527 g) and 5.27 g of 75% pure divinylbenzene were added along with 7 ml of xylene. This mixture was then maintained at 145° C for 24 hours. The reaction mixture was worked up in accord with the procedures of Example IV to yield a polymer product which was consistent with the structure

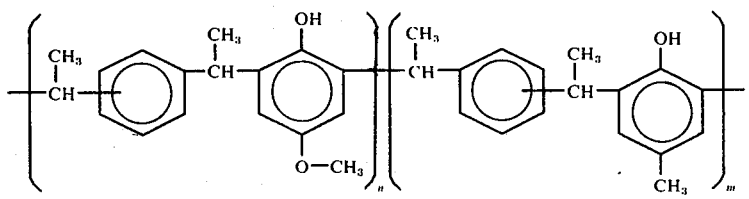

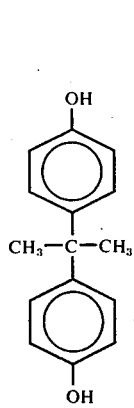

where $n + m$ is greater than 3.

EXAMPLE VI

Aluminum metal (0.044 g) and 0.755 g of p-cresol were heated together until the aluminum metal dissolved. Then 11.73 g of the bisphenol

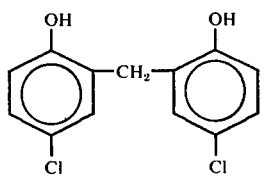

was employed.

The reactant amounts were:

| | |
|---|---|
| p-cresol | 4.3 g |
| bisphenol-A | 2.3 g |
| divinylbenzene (75% pure) | 7.8 g |
| aluminum | 0.05 g |
| solvent (mesitylene) | 24 ml |

The reaction temperature was about 160° C. The product had a molecular weight of about 6000.

EXAMPLE IV

Aluminum metal (0.095 g), phenol (9.62 g) and xylene (1 ml) were combined and heated together (160° C) for 15 minutes. Then 15.92 g of 75% pure divinylbenzene and 19 ml of xylene were added and the mixture maintained at 145°–155° C for 6 hours. The reaction mixture was cooled and worked up as follows: First the mixture was extracted into diehtyl ether. The ether extract was extracted with aqueous hydrochloric acid and twice with water. The ether extract was then dried with sodium sulfate. Some of the ether was evaporated and the concentrate was precipitated by being dropped into hexane. The precipitate was collected and dried an upon analysis found to have a structure consistent with the structure available from Aldrich Chemical Company was added along with 20 ml of xylene. The mixture was heated and cooled and crystals formed. 15 ml of di-n-butyl ether was added along with 3 ml of xylene and 7.9 g of 75% pure divinylbenzene. The mixture was refluxed for 24 hours, cooled and worked up in accordance with the methods of Example IV to yield a product which analyzed consistent with the structure

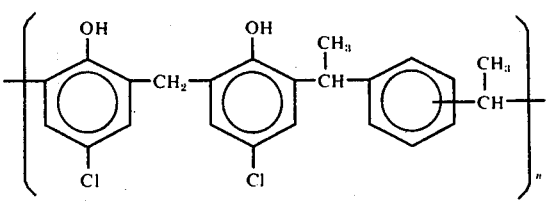

wherein *n* is greater than 3.

EXAMPLE VII

The general preparation of Example IV is repeated thrice with variations.

A. In the first variation the 15.9 g of 75% pure divinylbenzene is replaced in the reaction mixture by 21.8 g of 55% pure divinylbenzene. A reaction product essentially equivalent to the product of Example II is obtained, except that the molecular weight is only about two-thirds that of Example II.

B. In the second variation, 1 mmole of zirconium phenoxide, prepared in accord with Example I of Leston's U.S. Pat. No. 3,331,879 issued July 18, 1967, is employed as catalyst. A reaction product in accord with the present Example II is obtained.

C. In the third variation, the 15.9 g of 75% pure divinylbenzene is replaced by 15.81 g of 67% pure 1,7-octadiene. The final product is a polymer consistent with the formula

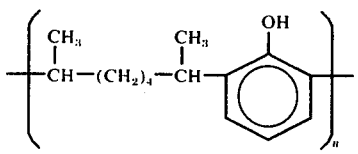

wherein $n$ is greater than 5.

EXAMPLE VIII

A principal utility of the products of this invention is as agents to inhibit the oxidation of substrates susceptible to oxidative attack. The activity as antioxidants of a number of the products prepared in Examples I through VII is determined as follows: 50 ml of substrate (freshly opened Wesson™ oil — a blend of cottonseed and soybean oils containing no additives and packed at the site of manufacture under nitrogen) containing 0.5 ml of benzene and 10 mg of a test material (200 ppm concentration) is placed in a 6 cm diameter by 8 cm high round glass jar and placed open in a forced air draft oven maintained at 80° C. A one ml sample is taken periodically and analyzed for peroxide content by iodometric titration.

The iodometric titration involves adding a constant amount of acetic acid - chloroform solution followed by a constant amount of pottassium iodide and back titrating with sodium thiosulfate to a starch indicator endpoint in accordance with A.O.C.S. (American Oil Chemists Society) method Cd-53. It is generally regarded that peroxide content and the rate of build up of peroxides in oils are a measure of the stability of oils. The slower the rate of peroxide value increase in oils with heating — the less prone to oxidation or more stabilized the oil is. (See for example, A.O.C.S. tentative method Cd 12-57 for more information on peroxides and oil stability). The test results as well as comparative results obtained with plain oil show that the present products do exhibit substantial antioxidant activity.

We claim:

1. The process for preparing a polymer comprising not less than 6 nor more than 80 diolefin phenolic units of the formula

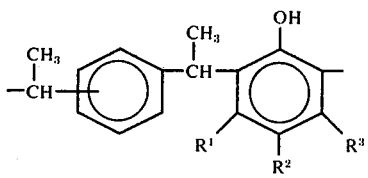

wherein one of $R^1$, $R^2$ and $R^3$ is hydrogen and the remaining members of $R^1$, $R^2$ and $R^3$ independently are selected from the group consisting of hydrogen, lower alkyls of from 1 to 6 carbon atoms, aralkyls of from 8 to 14 carbon atoms, and alkoxys and aralkyloxys of from 1 to 14 carbon atoms, which comprises contacting a liquid hydrocarbon mixture containing from 50 to 85% by weight divinylbenzene with the remainder being essentially ethylvinylbenzene and diethylbenzene with phenolic of the formula

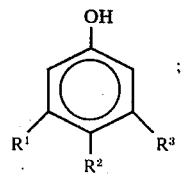

the molar ratio of divinylbenzene to phenolic being from 1.1:1 to 1:1.5; the contacting being effected in an amount of aprotic liquid reaction solvent to give an initial concentration of divinylbenzene of from 0.1 to 10 moles per liter; the contacting being effected at a temperature of from 80° to 250° C for a period of from 1 hour to 48 hours in the presence of a catalytically effective amount of a phenol orthoalkylation catalyst comprising aluminum.

2. The process of claim 1 wherein two of $R^1$, $R^2$ and $R^3$ are hydrogens.

3. The process of claim 2 wherein $R^1$, $R^2$ and $R^3$ are hydrogens.

4. The process of claim 1 wherein two of $R^1$, $R^2$ and $R^3$ are hydrogens and the remaining one of $R^1$, $R^2$ and $R^3$ is a lower alkyl of from 1 to 6 carbon atoms.

5. The process of claim 1 wherein two of $R^1$, $R^2$ and $R^3$ are hydrogens and the remaining one of $R^1$, $R^2$ and $R^3$ is a lower alkoxy of from 1 to 6 carbon atoms.

6. The process of claim 1 wherein $R^1$ and $R^3$ are hydrogen and $R^2$ is a methyl group.

* * * * *